Patented Nov. 25, 1924.

1,516,759

UNITED STATES PATENT OFFICE.

SPORS WOOLUMS, OF DETROIT, MICHIGAN.

SOLDERING MATERIAL.

No Drawing.  Application filed May 31, 1924.  Serial No. 717,139.

*To all whom it may concern:*

Be it known that I, SPORS WOOLUMS, a subject of the Republic of Greece, residing at Detroit, in the county of Wayne and State of Michigan, have invented certain new and useful Improvements in Soldering Material, of which the following is a specification.

This invention relates to a composition of materials for use in soldering, and more particularly for use in soldering aluminum parts together, or other metals to aluminum.

In so far as known, it has been considered impossible to solder parts formed of aluminum or aluminum alloys together as to other parts formed of other metals, such as copper, brass, steel, iron, or iron alloys, and to make a strong satisfactory soldered union. Aluminum and aluminum alloys have been soldered by the use of an aluminum solder, but such union has been found to be unsatisfactory due to the fact that dependable joints can not always be made and the union lacks the desired strength.

The object of the present invention is to provide a suitable material or flux which will act upon the metals to be united and permit a strong and dependable union to be made between parts formed of aluminum or unite aluminum to other metals, by the usual soldering operation, and the invention consists in providing a composition of materials for the purpose to be used in the manner of a flux, and which composition is harmless and not readily inflammable, non-gaseous and of limited acid content. The invention further consists in the composition of material, hereinafter more specifically set forth, and in the use of chemically equivalent materials for the purpose.

The composition embodying the present invention consists of equal parts of several animal fats, beeswax, sesame oil and olive oil which are subjected to sufficient heat to cause the solids to melt, and the ingredients are then thoroughly mixed. This composition may be used in the manner of a flux, being applied by a brush or in some such suitable manner to the aluminum or aluminum and other parts to be soldered together, which parts have been first thoroughly cleaned in any suitable manner. After the application of the composition, a solder preferably consisting of one part lead and two parts block tin is applied by means of the usual soldering iron and in the usual manner of soldering.

Stating more specifically the constituents comprising the animal fats employed, such fats include equal parts in weight of cow fat, cow butter, lamb fat, lamb butter, chicken fat, pig fat, and fish fat, and the vegetable oils are the substantially pure olive and sesame oils as sold commercially. Obviously these oils and the different kinds of fats or their chemical equivalents may be used and the fats may be provided in the raw or other state suitable for compounding in the manner described.

By treating with this composition of material, the surfaces to be soldered, it is possible to solder together in the usual manner, two pieces formed of aluminum or aluminum alloys, solder aluminum to brass, aluminum to copper, aluminum to tin, or aluminum to iron, steel or to any of several metal alloys. This composition of material is used in the same manner as a flux, and as its ingredients are harmless, it may be used without fear of injury to the persons hands, and there will be no danger from fire as the material is not readily inflammable or gasifiable.

Having thus fully described my composition of material and the manner in and purpose for which it is used, what I claim is:—

1. A composition of material for the purpose described, including animal fats, vegetable oils, and beeswax.

2. A composition of material for the purpose described, including animal and vegetable oils and beeswax.

3. A composition of material for the purpose described, including fish and vegetable oils and beeswax.

4. A composition of material for the purpose described, including animal and fish fats, vegetable oils and beeswax.

5. A composition of material for the purpose described, including sesame oil and beeswax.

6. A composition of material for the purpose described, including animal fats, fish fat, sesame oil and beeswax.

7. A composition of material for the purpose described, including animal fats, fish fat, sesame oil, olive oil and beeswax.

8. A composition of material for the purpose described, including butter fats, animal fats, fish oil, sesame oil and beeswax.

9. A composition of material for the purpose described, including butter fats, cow, lamb, chicken, pig and fish fats in equal porportions, olive oil, sesame oil, and beeswax in proportions similar to the several proportions of fats.

In testimony whereof I affix my signature in presence of two witnesses.

SPORS WOOLUMS.

Witnesses:
LEWIS E. FLANDERS,
ANNA M. DORR.